Patented Feb. 18, 1930

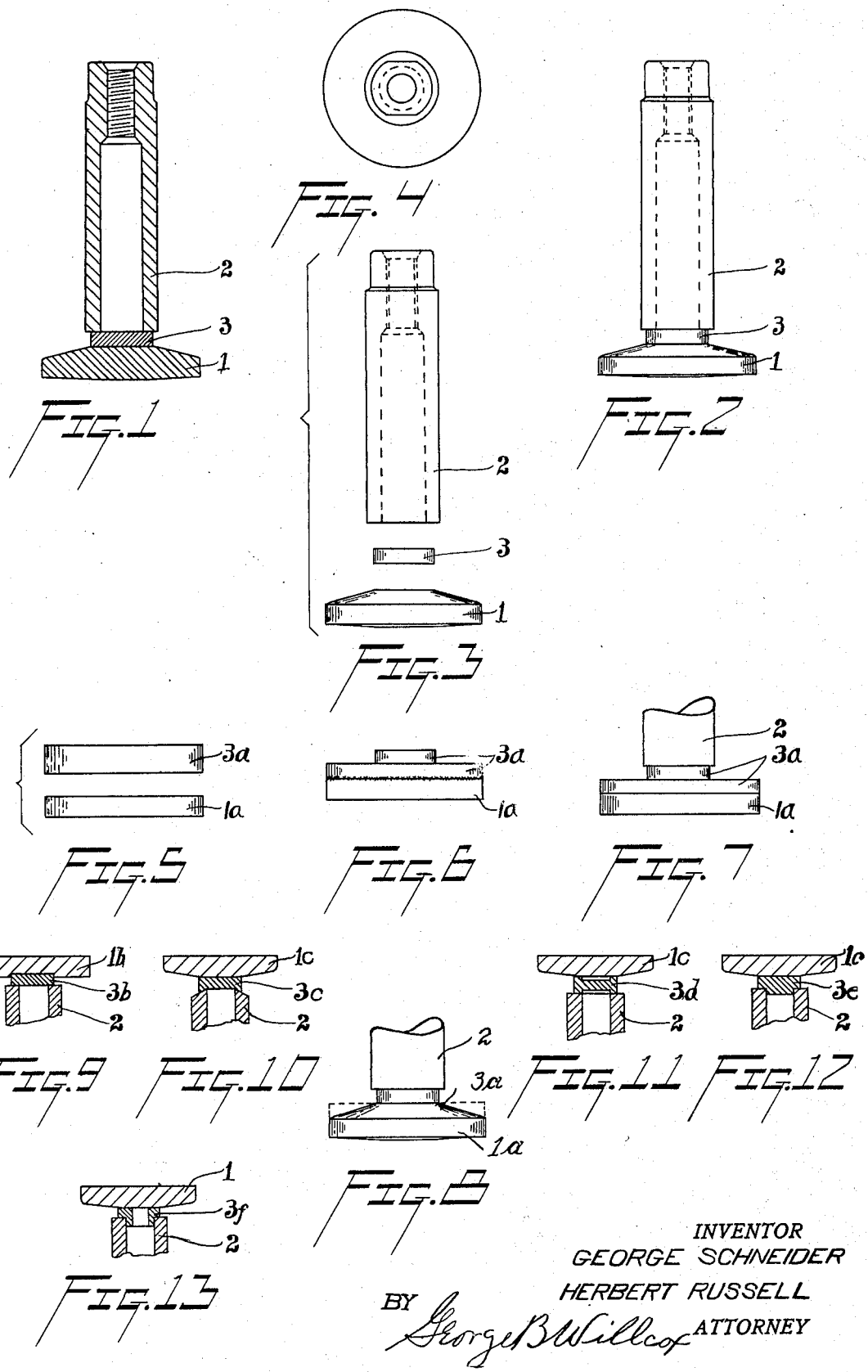

1,747,490

UNITED STATES PATENT OFFICE

GEORGE SCHNEIDER, OF SAGINAW, AND HERBERT RUSSELL, OF FREELAND, MICHIGAN, ASSIGNORS TO WILCOX-RICH CORPORATION, OF DETROIT, MICHIGAN, A CORPORATION OF MICHIGAN

TAPPET

Application filed March 26, 1928. Serial No. 264,818.

This invention belongs to that class of tappets in which a head is united to a tubular body by welding. These so-called two-piece tappets usually have heads of chilled white iron or the like. In manufacturing practice iron of that kind can not always be welded perfectly enough to make a satisfactory joint. Likewise, the thin-walled tubular bodies, usually of a different metal, for example high carbon steel, are also somewhat difficult to weld under conditions of mass production.

In addition to being inherently rather poorly adapted for electric welding these heads and bodies differ widely in their welding characteristics. They become fluid at quite different temperatures and when cooled they contract differently and at different rates. Moreover, a thin-walled tubular tappet body of high carbon steel becomes dense and brittle very quickly upon cooling; white chilled iron heads act in somewhat the same way; but to a lesser degree and more slowly. Consequently there is always likelihood that when the two parts are welded directly to each other the joint may become fatigued and brittle, especially after subjection to sharp impacts, as in long continued operation in an internal combustion engine. It is vital that tappets must not fail in the welded joint that unites the heads and bodies.

The difficulties of welding a tappet head of one material direct to a thin tubular body made of another material, where both materials are not of readily weldable character and furthermore possess welding characteristics that differ widely from each other, are thoroughly overcome in the structure of the present invention. Hence to avoid the stated obstacles to the satisfactory welding of, for example, a high carbon steel thin tubular body to a white chilled iron solid head is one of the important objects of our invention.

Another object is to provide a tappet construction in which the head and the body are so simply shaped that they can be manufactured very cheaply, requiring only a small amount of machine work to prepare them for assembling, and using a minimum of material.

Such desirable simplicity of shape for the head and body becomes possible by reason of our novel means for uniting them. It permits the head, which is of extremely hard white chilled iron, to be made in the form of a simple disk or button, there being no projecting shank or neck as heretofore. Moreover, this new uniting means allows the thin-walled tappet body to be made of a short plain cut-off piece of high carbon steel tubing, yet provides a most satisfactory joint.

Considered in its broad aspect the claimed means for attaining these results is a piece of metal, characterized by the fact that it is of such quality as to enable it to be welded easily to white iron and also easily weldable to high carbon steel. The said piece of easily weldable metal is interposed between the head and the body of the tappet and is welded to both.

A still further object is to provide what may be termed a "ready made" neck of reduced diameter as an intermediate piece interposed between the tappet head and the end of the tubular body, as contrasted with a reduced neck such as usually provided by machining the lower end of the tappet body. In the new, as in the old constructions the function of a reduced neck is to produce a groove at the junction of the head and body that permits the body to over-travel the bracket in which it slides, thereby avoiding wear of the tappet surface.

With the foregoing and certain other objects in view, which will appear later in the specifications, our invention comprises the devices described and claimed and the equivalents thereof.

In the drawings Fig. 1 is a longitudinal section of a tappet embodying our invention.

Fig. 2 is a side view of the same.

Fig. 3 is a side view, showing the tappet members separated.

Fig. 4 is an end view.

Figs. 5, 6, 7 and 8 are side views, showing a modified form of tappet head embodying the invention in its four successive stages of manufacture.

Figs. 9, 10, 11, 12 and 13 are fragmentary longitudinal sectional views, showing various modifications in the shape of the joint members.

As is clearly shown in the drawings, numeral 1 indicates the tappet head of disklike or other suitable form, preferably made of white chilled iron. Its cam-contacting face is polished and glass-hard. 2 is a tubular body, preferably thin-walled and made of high carbon steel hardened and polished on its outer surface.

The difficulty of welding these two pieces together, especially with regard to the thin-walled tube 2, have already been set forth.

Our invention consists in supplying an intermediate member 3, preferably in the form of a circular disk or button and made of relatively soft easily weldable material, such as mild steel. This intermediate member is placed between the head 1 and the end of the tubular body 2 and welded by any suitable means, as for example the electric butt-welding process. Member 3 may take various forms, as for example those shown in Figs. 5 to 13 inclusive, but in each instance it consists in a piece of metal of suitable shape interposed between the head 1 and end of body 2 and is of such quality as to enable it to be easily weldable to both.

In Fig. 1 the member 3 is welded to the head 1 over the entire area of its lower face, and to the tubular body 2 around an annular area defined by the lower end of the body.

In Figs. 5 to 8 inclusive the tappet head is of modified form, being a plain circular disk 1ª and the intermediate member is in the form of a flat disk 3ª as large in diameter as the head 1ª. These two pieces are welded together, as indicated in Fig. 6, and the upper part of disk 3ª is machined down to form a projecting neck, which, as indicated in Fig. 7 is then welded to the end of tubular body 2, after which the disk 3ª and head 1ª are turned to finished shape, as indicated by the full and dotted lines. In this form the intermediate member of soft steel or other easily weldable material requires to be shaped by machne work, but in so far as its welding properties and functions are concerned it is the same as the member 3 shown in Figs. 1, 2 and 3.

In the modified form of Fig. 9, 1ᵇ is a disk with countersunk face to receive the flat member 3ᵇ in the form of a small diameter circular disk.

In Fig. 10, 1ᶜ and 3ᶜ are respectively the head and a welding member counter bored on one face to receive the beveled end of tubular body 2.

Fig. 11 shows the welding member 3ᵈ of H-shaped cross section.

In Figs. 12 and 13 modfied forms 3ᵉ and 3ᶠ are respectively disk-shaped, formed with bosses received in the tubular bore or body 2, that of Fig. 13 bored out for lightness.

The diameter of the intermediate member 3, where it is welded to the end of tubular body 2, is slightly smaller than the diameter of the body, forming a neck of reduced diameter between the head and the body, and thus avoiding the necessity for special machining after welding.

We have found that the interposition of easily weldable material 3 is a completely satisfactory solution of the welding difficulties heretofore encountered, and that the electric butt-welding process gives a perfect joint between the member 3 and the white iron head 1 and the high carbon steel thin-walled tube 2 without any appreciable change of form of the surfaces during welding and without liability of temperature complications, such as are caused by surging at the commencement of the weld.

Having thus described our invention, what we claim and desire to secure by Letters Patent is:

1. In a tappet comprising a head of hardened cast metal and a thin-walled tubular body of high carbon metal, an intermediate member consisting of a piece of easily weldable metal, disk-shaped and of slightly smaller diameter than the outside diameter of said tubular body, interposed between said head and body and secured thereto by welding.

2. In a tappet comprising a head of cast metal and a tubular body of high carbon metal, an intermediate member consisting of a piece of easily weldable metal, slightly smaller than the outside diameter of said tubular body, interposed between said head and body and secured thereto by welding.

3. In a tappet comprisng a cast iron head and a thin-walled tubular body made of high carbon steel, an intermediate member consisting of a piece of metal interposed between said head and body and secured thereto by welding, said piece of metal presenting an enlarged contact area for welding to the cast iron head and a thin annular area for welding to the high carbon steel tubular body.

4. A tappet constructed as set forth in claim 3 in which the said intermediate piece of metal is of circular shape and of slightly smaller outside diameter than the outside diameter of the tubular body, to form a reduced neck, for the purposes set forth.

In testimony whereof we affix our signatures.

GEORGE SCHNEIDER.
HERBERT RUSSELL.